Figure 1:
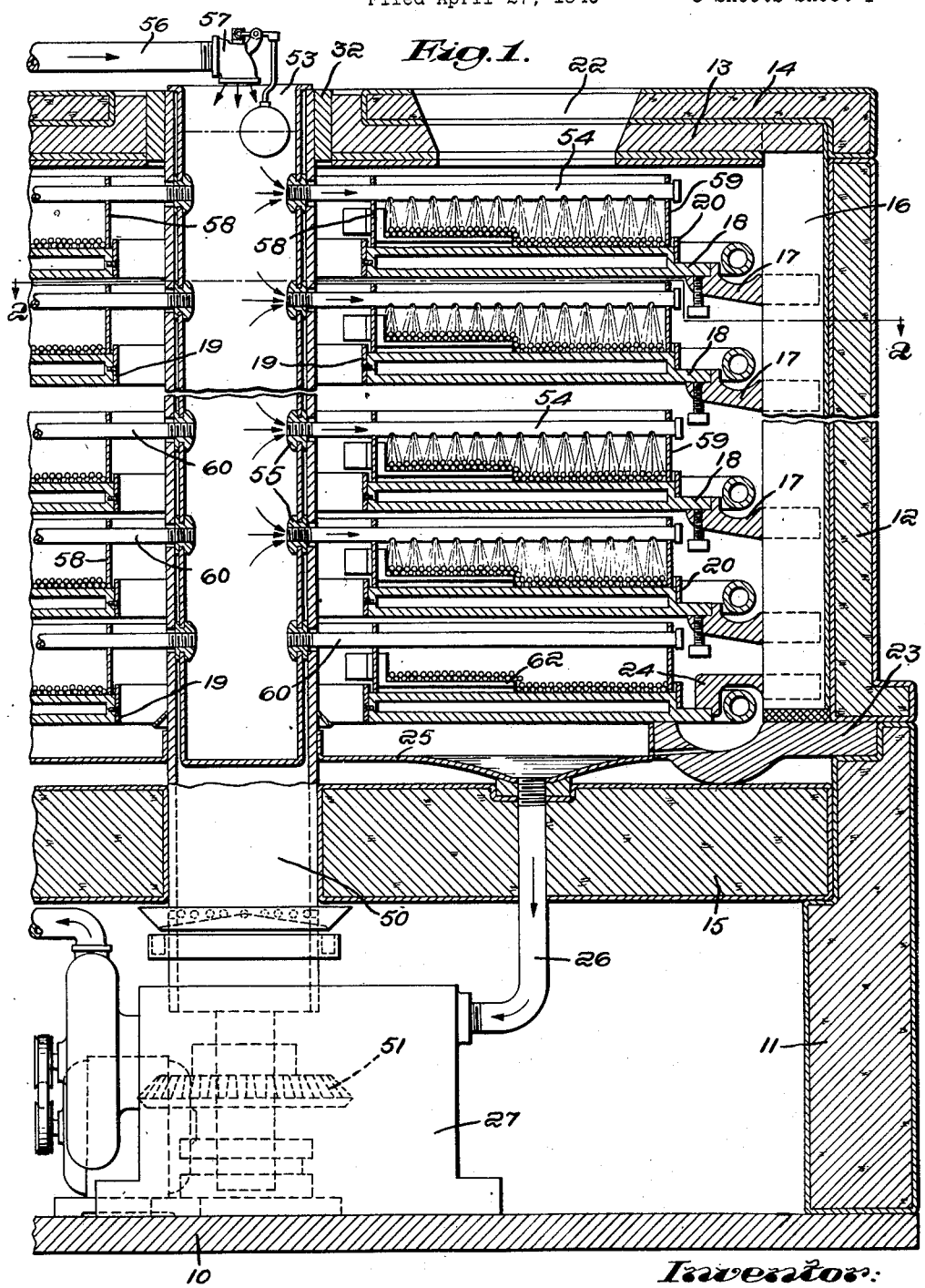

Oct. 19, 1943.　　　C. BIRDSEYE　　　2,332,367
FREEZING FOOD PRODUCTS
Filed April 27, 1940　　　3 Sheets-Sheet 1

Oct. 19, 1943.  C. BIRDSEYE  2,332,367
FREEZING FOOD PRODUCTS
Filed April 27, 1940  3 Sheets-Sheet 2
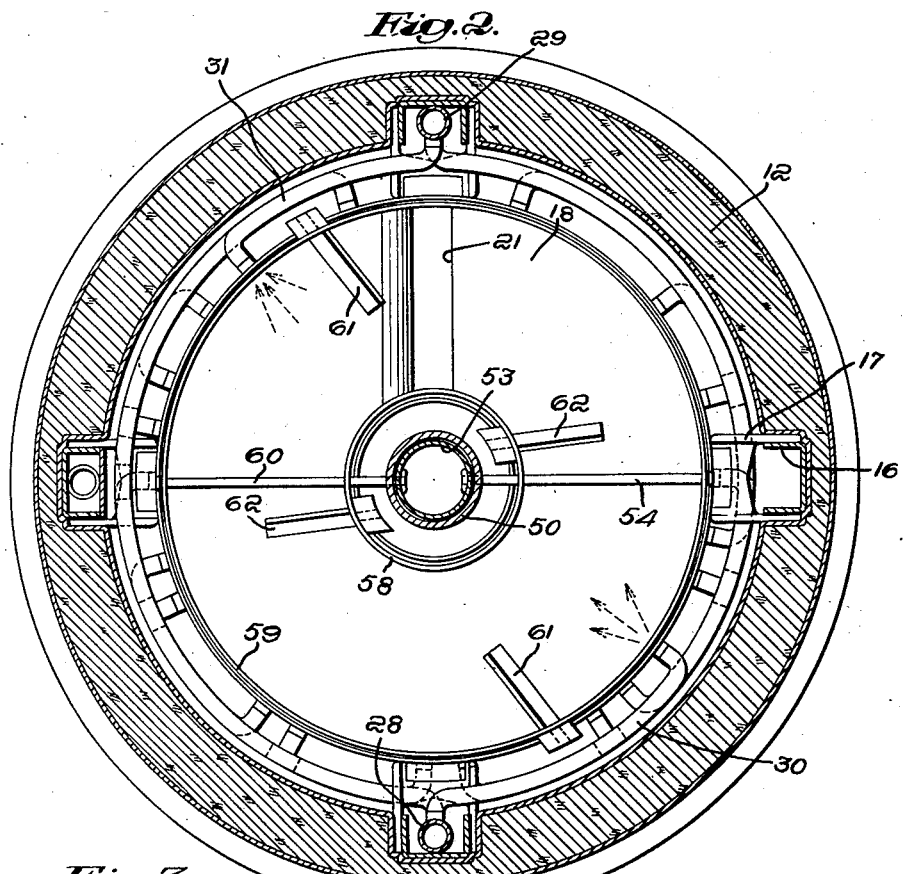

Oct. 19, 1943.    C. BIRDSEYE    2,332,367
FREEZING FOOD PRODUCTS
Filed April 27, 1940    3 Sheets-Sheet 3

Inventor:
Clarence Birdseye
by Conway & Witter
Attorneys

Patented Oct. 19, 1943

2,332,367

UNITED STATES PATENT OFFICE 2,332,367

FREEZING FOOD PRODUCTS

Clarence Birdseye, Gloucester, Mass., assignor to Mechanical Research, Inc., Providence, R. I., a corporation of Rhode Island Application April 27, 1940, Serial No. 331,991

22 Claims. (Cl. 62—104)

This invention relates to the freezing or quick freezing of food products, particularly those which in the mass naturally contain a relatively large proportion of air spaces and are therefore relatively poor conductors of heat. Shrimp is a product of that kind, and the process of freezing shrimp upon a refrigerated surface has heretofore been objectionably slow because of the retarding effect of air spaces present in the mass. I have discovered that such food products may be rapidly and efficiently frozen by using a liquid refrigerant to wet or immerse them as they are passed over a refrigerated surface. Such a secondary refrigerant itself not only acts as a refrigerating medium, but improves the heat interchange between the product and the refrigerating surface upon which the product rests, or over which it is being passed. It also tends to fill the air spaces in the product with a medium which is a much better heat conductor than air and so increases the rate of heat transfer from one to another of the units of the mass of food product being treated. In these three different ways, therefore, it expedites the quick freezing process.

I may use the liquid refrigerant merely to wet the product before it is delivered to the refrigerating surface, or to spray the product while upon the refrigerated surface; or I may actually immerse or float the product in a bath of liquid refrigerant which is itself passed across and in contact with the refrigerated surface. For purposes of clarity I have hereinafter referred to this last-named procedure as an "immersion process."

In one aspect, therefore, the present invention consists in a novel process of freezing food products characterized by the steps of passing the product along and in contact with a refrigerated heat-conductive surface, meanwhile wetting both the surface and the product with a refrigerating liquid having a temperature lower than that of the product.

In another aspect my invention comprises a novel quick freezing process which is characterized by immersing or floating the product in a liquid refrigerant upon a refrigerated surface.

According to this process the product is not necessarily brought into contact with a refrigerated surface, but is at least partially immersed and floats in a low-freezing-point liquid which is itself conveyed around and in contact with the refrigerated surface and preferably is cooled by that contact.

When products not treated or immersed in a liquid refrigerant are frozen by being passed along and in contact with a refrigerated surface the product adheres to the surface and must be freed from it as the product is advanced. In the immersion process of my invention the product does not, at any time, freeze to the refrigerated surface, but is suspended over the surface in the liquid which itself contacts the refrigerated surface and serves as an intermediate heat transfer medium. In quick freezing by this immersion process moreover, the product is moved along with the refrigerated liquid steadily and preferably at uniform speed. When no free liquid refrigerant is used the product—when it consists of a mass of individual units—emerges from the freezing apparatus with each unit covered with minute frost crystals, but otherwise in a dry condition; while from the immersion process the product emerges in a stream of liquid from which the frozen units are subsequently separated. After such separation the refrigerating liquid passes into a reservoir from which it may be recirculated over the refrigerated surface to aid in freezing additional product. In this aspect accordingly, my invention comprises a process of freezing food products which includes the steps of passing the product, while submerged in or floating on a liquid having a freezing point lower than that of the product, across a refrigerating surface having a temperature lower than that of both the liquid and the product.

In my prior Pat. No. 2,229,000 granted January 14, 1941, I have disclosed multiple plate apparatus for quick freezing food products in which the product is passed along and in contact with the refrigerated surfaces of the respective plates and transferred by gravity from one plate to another. For purposes of illustration the present invention is shown as practiced with the aid of apparatus of that type, although, of course, it is not limited to that or to any specific form of apparatus.

As shown in that patent I prefer to utilize a series of annular refrigerated plates arranged one above another, and provided with staggered openings by which the product may drop or pour from one plate to the next lower plate in the series. One convenient construction for supplying spray to the products consists in a hollow central shaft enclosing a reservoir for a liquid refrigerant and provided with transversely extending spray pipes disposed in the spaces between consecutive plates or some of them. The shaft may be rotated so that the spray pipes sweep over the refrigerating plates in a circular path, completely wetting the product and the annular supporting surface upon which it rests. Associated with each plate is a product-moving device designed to advance the product along the refrigerated surfaces and toward and into the openings through which it falls to the next lower plate. The food product being treated is deposited upon the upper plate of the series as a mass of unfrozen units and is gradually transformed during its progress through the apparatus into hard, solidly frozen units wetted with or floated by the liquid refrigerant.

Preferably and as herein shown, after leaving the lowermost plate in the series the frozen product is passed over a perforated surface so that the refrigerating liquid may be drained from the product, and returned for recirculation through the apparatus to aid in the freezing of additional product.

Figure 4:
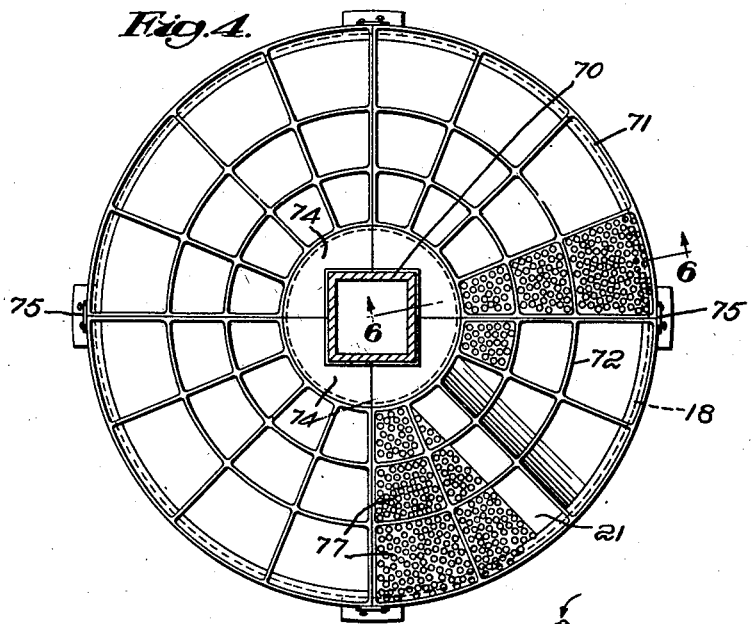
Figure 5:
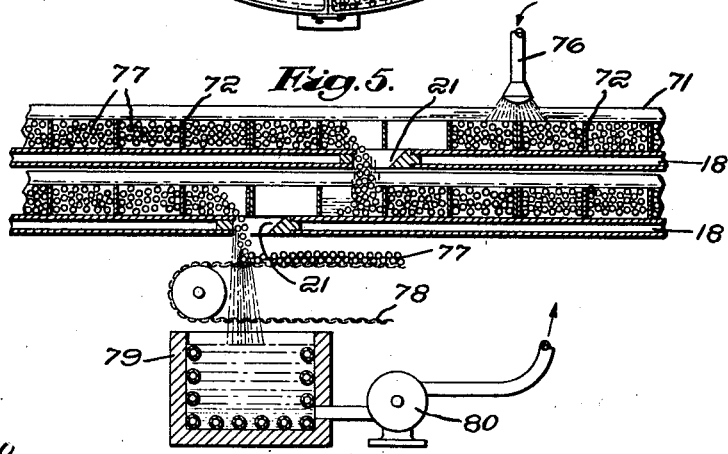
Figure 6:
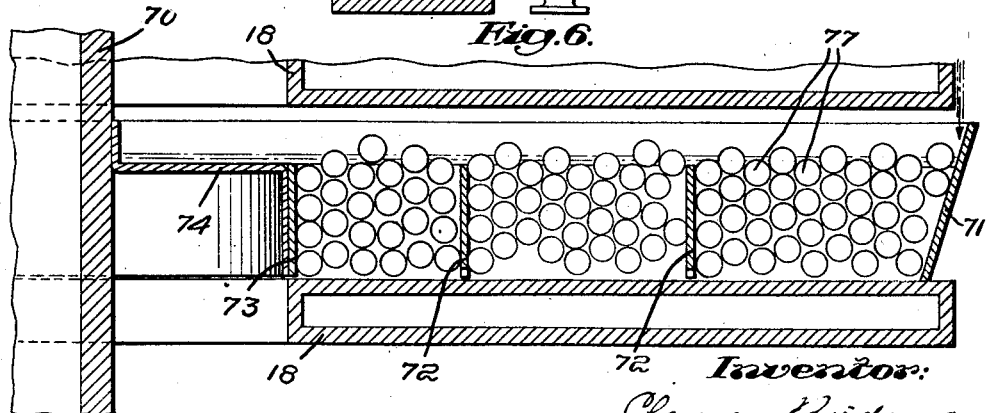

These and other features and characteristics of the invention will be best understood and appreciated from the following description of a preferred embodiment of apparatus selected for purposes of illustration and shown in the accompanying drawings in which, Fig. 1 is a partial view of the apparatus in longitudinal section, Fig. 2 is a view in cross section on the line 2—2 of Fig. 1, Fig. 3 is a view of the base section in longitudinal section on a different plane from that used in Fig. 1, Fig. 4 is a plan view of one plate of the apparatus equipped for the immersion process of freezing, Fig. 5 is a diagrammatic view in vertical section showing two plates and other elements of the apparatus, and Fig. 6 is a fragmentary view in cross section of one of the plates and associated parts.

The apparatus as herein illustrated may be cylindrical in shape and includes a base plate 10, an enclosed base section 11, and a main section 12 disposed above and carried by the base section 11. The walls of the base and main sections are preferably hollow metallic shells having a filling of cork composition or other heat insulating material. The main section is separated at its bottom from the base section by an insulated horizontal partition, 15, and is closed at its upper end by a metallic cover 13 having an annular insulating section 14 of the same general insulated construction as the body sections of the apparatus. The cover 13 is provided with bearings 32 for a hollow vertical shaft 50 which will be referred to presently in more detail. The partition 15 is centrally apertured for the passage of this shaft.

The main section 12 is provided with four spaced vertical channels in each of which is provided a channel iron 16 and these channel irons form collectively a rigid frame for supporting the refrigerated plates of the apparatus. Inwardly projecting brackets 17 are bolted or otherwise secured to the channel irons 16 at the proper height and each series of brackets adjustably supports a hollow annular plate 18 at a predetermined height and in level position. Each plate has a substantially radially disposed discharge opening 21 in its surface through which the material being treated may drop from plate to plate in the refrigerating process. The openings are staggered between adjacent plates so that material falling through the opening 21 of one plate will reach the surface of the next lower plate just ahead, i. e. on the leading side of the opening 21 in said plate. The covers 13 and 14 are provided with a corresponding opening 22 through which the unfrozen product may be delivered to the uppermost plate of the series.

Each of the refrigerating plates is provided with a cylindrical inner rim or wall 19 and a corresponding outer rim or wall 20. These walls are secured rigidly to the inner and outer circumferences of the plates and project above the upper surface of the plates. They cooperate with movable walls in maintaining the refrigerating liquid and product in place within the freezing zone thus defined. The lowermost plate of the series is supported by an annular supporting ring 23 which is held in the walls of the apparatus and projects inwardly above the partition 15. Clamps 24 are provided for centering and holding the lower plate and an annular collecting pan 25 extends circularly beneath the lowermost plate, and inside the supporting ring 23. The purpose of the pan 25 is to collect the drip of liquid refrigerant or other moisture which may be splashed from the refrigerating plates or otherwise accumulate in the apparatus. The pan is provided with a discharge pipe 26 by which the refrigerant may be returned to a recirculating and refrigerating unit 27 which is conveniently provided in the base section 11.

The refrigerating plates as already explained are hollow and are connected in the apparatus so that a liquid or gaseous refrigerating medium may be circulated through them. Suitable baffles (not shown) may be provided for causing this medium to follow a circuitous path within the plates. A supply pipe 28 for said refrigerating medium is arranged to extend vertically in one of the vertical channel irons 16 and a corresponding discharge pipe 29 is disposed within one of the oppositely located channel irons. As shown in Fig. 2 the supply pipe 28 is connected to one of the refrigerating plates 18 by a circularly extending pipe 30 and the discharge pipe 29 is similarly connected to the same plate by a circularly extending discharge pipe 31.

The recirculating unit 27 may be of any suitable commercial construction and located in the base of the apparatus, being shown with its connections only conventionally.

The principal stationary parts of the apparatus having now been described, the description will progress to the movable parts. The hollow shaft 50 is provided with a vertical bearing carried by the base plate 10 and with a beveled gear 51 by which it is driven by a beveled pinion 52 from any suitable source of power (not shown). The shaft carries a hollow tubular reservoir 53. Projecting radially from the reservoir and through holes provided in the walls of the shaft for that purpose is a series of radial spray pipes 54 each having downwardly inclined spray openings. The spray pipes 54 extend substantially to or beyond the outer circular walls 20 of the refrigerating plates and are set in threaded fittings 55 where they lead from the tank 53. A supply pipe 56 for brine or other liquid refrigerant leads to the top of the tank 53 where it is provided with a float check valve 57 by which the level of the liquid may be maintained substantially constant in the reservoir. As the hollow shaft 50 is rotated the reservoir and the spray pipes turn with it and thus a constant spray of liquid refrigerant at a temperature below the freezing point of the product may be supplied to the product which has been delivered to the plates 18 and to the surface of these plates. The amount of spray thus delivered may be controlled by regulating the size of the spray openings in the pipes 54 and the best results are usually obtained, particularly in handling such a food product as shrimps, by thoroughly drenching a mass of the product with the liquid refrigerant.

As herein shown the inner and outer stationary walls 19 and 20 of the refrigerating plates are supplemented by inner and outer circular walls 58 and 59 which are circumferentially movable. These walls rest upon the surfaces of the respective plates a slight distance within the stationary walls and are provided with apertures for the passage of the spray pipes 54 which thus constitute driving means for rotating the movable walls. Usually a single spray pipe is enough to supply sufficient refrigerant to each refrigerating plate and in that case threaded rods 60 may be utilized as supplementary driving means and to balance the rotary driving impulse imparted to the movable walls 58 and 59.

The movable walls 58 and 59 may be also utilized to carry transversely disposed outer scrapers 61 and inner scrapers 62. These may be of the general character disclosed in my prior patent above identified and may comprise thin straight blades disposed at an acute angle to the surface of the refrigerating plate upon which they travel and having their edges yieldingly maintained in contact with the surface of the plate. The purpose of the scraper blades is to remove from the surface of the plate any frost film or other frozen deposit which may form thereon, to lift the product progressively from the refrigerating surface of the plate, thereby stirring and intermittently advancing the product along the surface of the plate and toward the opening 21 through which it may fall to the next lower plate. This advancing or feeding movement of the product takes place at a rate appreciably slower than the movement of the scraper blades and is dependent among other factors upon the number and shape of these blades. As herein shown two outer scraper blades 61 and two inner scraper blades 62 are provided, these being set 90° apart and at a retreating angle of about 15° to a corresponding radius. As the food product is lifted from the surface of the plate 18 by the scraper blades it is of course stirred and so better exposed to the refrigerating spray.

The refrigerating process progresses as above outlined as the product is passed along the surface of the refrigerating plates and from plate to plate, except that if desired the spray equipment may be omitted from certain of the plates. As shown in Fig. 1, a solid driving rod is substituted for a spray pipe above the lowermost refrigerating plate. No additional spray is therefore supplied to the product during the final portion of the refrigerating process.

The opening 21 of the lowermost refrigerating plate is provided with a short chute 63 which is located directly above the opening 64 in the partition 15 and leads to a horizontal conveyor duct 65 which is perforated throughout a portion of its length. A liquid collecting chamber 66 is arranged beneath the conveyor duct 65 and provided with a discharge pipe 67 leading back to the liquid-recirculating unit. Accordingly the liquid refrigerant is drained from the frozen product as the latter is passed outwardly in the conveyor duct by the action of a rotary screw conveyor 68.

While I have shown the apparatus as equipped with a centrally located tank and radial spray arms for wetting the product, it will be understood that this is only for purposes of illustration, and that the spray may be supplied in any other convenient manner as, for example, from circumferentially arranged spray pipes. Further, in one aspect it would be within the scope of the invention to treat the unfrozen product with a refrigerating spray before actually delivering it to the refrigerating plates. The amount of spray may be adjusted so as to equalize the amount of refrigerating work done between the various plates.

In Figs. 4, 5 and 6 is shown apparatus similar to that of Figs. 1-3 but adapted for carrying out the immersion process of quick freezing above mentioned. In this apparatus each of the plates is provided with a circular grill having an open bottom and being actuated to move circumferentially while resting upon its underlying refrigerated plate, and while being supplied with a liquid refrigerant, which may be brine, an invert sugar solution, a mixture thereof, or other low-freezing-point liquid selected as best adapted for use with the particular product to be quick frozen.

In the illustrated apparatus the refrigerated plates 18 may correspond to those already described in construction and general location in the apparatus. The central shaft 70 is herein shown as being square in cross section. It may be fabricated in this shape, or a circular shaft having square collars thereon, one for each plate, may be employed. The grill is made up of four sections or quadrants each comprising an outer circumferential wall 71 which is outwardly inclined as shown in Fig. 6 for the purpose of catching the drip and overflow from the next higher plate in the series. Each grill section has radial walls and inner circumferential walls 72 of less height than the outer circumferential wall 71. The inner circumferential wall of the grill is of the same height as the intermediate walls and has secured to its surface a sector angle plate 74 which extends inwardly and is then turned upwardly and presents a flange cut out to fit the square section of the shaft. The inclined outer wall of the grill is continuous and rests upon the upper surface of its supporting plate 18 in fairly fluid-tight relation. The intermediate radial walls of the grill, however, are serrated in their lower edges to facilitate flow of the liquid refrigerant beneath them and along the surface of the plate to bring about greater heat transfer, and to permit the use of larger quantities of the liquid refrigerant without the possibility that the refrigerant may carry the product around the plate at a speed greater than that of the grill. The circumferential walls 71 of the quadrants are connected by removable latch pieces 75 and studs projecting outwardly from the walls. By disengaging these latch pieces 75 the individual grill sections are released and may be freely removed from the apparatus in case it is desired to use the apparatus for other types of freezing processes or to clean it.

As illustrated somewhat diagrammatically in Fig. 5 liquid refrigerant is copiously supplied to the uppermost plate, or to an upper plate in the series, from a vertical nozzle 76. The fresh product units 77 are supplied to the grill as the latter moves beneath the inlet opening of the apparatus. The grill is then filled with the liquid refrigerant and the product units 77 are immersed and floated above the refrigerated surface of the plate 18 as indicated in Fig. 6. The refrigerant is supplied in quantity sufficient completely to fill the grill and to overflow it, maintaining a liquid level above the intermediate walls 72 of the grill and flowing in both directions upon the plate 18. The immersed or partially immersed product is advanced by the movement of the grill until the grill passes over the discharge opening 21 in the bottom of the plate. When this opening is reached the chilled product and liquid refrigerant falls or spills through the opening into the grill upon the next lower refrigerating plate. Here again the product is maintained immersed and floating above the surface of the plate. It is again carried circumferentially along with the grill and spilled through the discharge opening 21 to the next lower plate, or as suggested in Fig. 5, to a mesh conveyor 78 by which the now frozen product units 77 are carried out of the apparatus while the refrigerant is drained away and collected in a refrigerated tank 79. Here it is chilled and recirculated to the uppermost flooded plate in the series by means of a pump 80. The frozen product meantime passes out of the apparatus where it may be packed in receptacles of any desired size. If instead of a refrigerant such as brine or invert sugar solution, the frozen product includes cream or other esculant liquid, the discharge apparatus is suitably modified to handle a slushed product or a slushed product containing frozen units.

It will be understood that some of the secondary refrigerant, viz. the brine, may freeze to the surface of the refrigerated plates, in which event it will be scraped off as ice by the scraper blades and mixed with the brine. If an accumulation of such ice passes from the apparatus with the brine and the product, the slushed refrigerating mixture, after separation from the product units, is pumped back to the upper plates in the series and, in thawing, takes part of the refrigerating load off the upper plates. It will be appreciated that in continuously running the apparatus the uppermost plates of the series tend to become warmer than the lower plates, since the upper plates first encounter the unchilled product. By insuring the delivery of a mixture of liquid refrigerant and ice to the uppermost plates the latent heat of the ice is effective in maintaining the low temperature of the secondary refrigerant where the latter is subjected to the most exacting requirements of the apparatus.

It is contemplated that the temperature of the refrigerated plates and the liquid refrigerant may be widely varied and adjusted in accordance with the product being frozen and other conditions encountered in each instant case. For example, in freezing shrimp the plates may be refrigerated to a surface temperature of −10° F. and a refrigerant supplied at a temperature of about 0° F. It will be maintained substantially at that point since the heat absorbed by it from the shrimp is continuously given up to the cooler plates.

As the term freezing point is generally used in the industry it would mean about 26° F. to 28° F. in the case of shrimp, which would be frozen hard at from 10° F. to 15° F. and would be brittle at anything below 8° F. In general the moisture in flesh products begins to congeal at about 31° F. but all the moisture content is not congealed until the temperature has been reduced to a very low point.

In the immersion process above described, the product will be floated upon, partially immersed or entirely immersed in the secondary liquid refrigerant depending upon the relative specific gravities of the product and of the refrigerant. For instance blanched corn-on-the-cob would probably sink in an alcohol refrigerant, while shrimp would float very high in a strong salt solution. In many instances, however, the lower units of the mass of the product would be completely immersed in the refrigerant, certain other units would be partially immersed, and still others might temporarily be held above the surface by the buoyancy of the mass of product below them.

Having thus described my invention I claim as new and desire to secure by Letters Patent:

1. The process of freezing a food product, which includes the steps of passing the product along and in contact with a horizontal refrigerated heat-conductive surface, meanwhile wetting both the surface and the product with a refrigerating liquid having a temperature lower than that of the product being frozen and higher than that of the said refrigerated heat-conductive surface.

2. The process of freezing a food product, which includes the steps of passing the product along and in contact with a horizontal refrigerated surface, and lowering the temperature of the product by causing it to give up heat to a refrigerating liquid cooled by contact with said surface to a temperature lower than that of the said product.

3. The process of freezing a food product, which includes the steps of passing both the product and a refrigerating liquid along and in contact with a substantially level heat-conductive refrigerated surface, thus reducing the temperature of the said refrigerating liquid and passing heat from the product through the liquid to the refrigerated surface.

4. The process of freezing a food product, which includes the step of passing the product, while wetted with a refrigerating liquid having a freezing point lower than that of the product being frozen, along and in contact with a substantially level refrigerated heat-conductive surface to which heat passes from both the product and the liquid.

5. The process of freezing a food product, which includes the steps of advancing the product across the surface of a substantially level refrigerated plated while subjecting the product to a spray of liquid refrigerant and reducing the temperature of the said liquid refrigerant by contact with the plate.

6. The process of freezing a food product, which includes the steps of advancing the product along the surfaces of several superposed substantially level, spaced refrigerating plates while subjecting the product to a spray of heat-conductive liquid, then advancing the product over a refrigerated surface without subjecting it to the spray.

7. In an apparatus for refrigerating food products, the combination with a hollow heat-conductive refrigerated plate and means for supplying a refrigerating medium to the plate, of means for passing a product to be refrigerated along and in contact with the surface of said plate, and means for applying a liquid refrigerant to the product and the surface of said plate at a temperature lower than the product, whereby the refrigerant aids in transferring heat from the product to the plate.

8. In an apparatus for refrigerating food products, the combination with a series of spaced refrigerated plates, arranged one above another in horizontal position, of means for advancing a food product along the surface of one plate after another, and means for wetting the product upon the plates with a liquid refrigerant.

9. In an apparatus for refrigerating food products, the combination with a series of refrigerated plates having annular freezing zones defined thereon, of means for advancing a food product along said zones, and rotary means for sweeping a spray of liquid refrigerant over the product in the freezing zones.

10. In an apparatus for refrigerating food products, the combination with a series of refrigerated plates, of means for defining annular freezing zones thereon, means for directing a refrigerating spray upon a food product distributed in said zones, and means for progressively lifting portions of the sprayed product from the surface of the plates so that it may become fully wetted by the spray.

11. In an apparatus for refrigerating food products, the combination with a refrigerated plate, of walls defining a freezing zone thereon, a spray pipe for directing a refrigerating spray upon a food product located between the walls, and a scraper for lifting congealed portions of the product out of contact with the surface of the plate.

12. The process of freezing food product units, which includes the steps of distributing and supporting such units in walled areas above a refrigerated surface, and partially immersing the distributed units in a liquid refrigerant cooled by the said refrigerating surface and having a temperature lower than that of the units being frozen.

13. The process of freezing a food product, which consists in distributing the product between perforated upright walls supported upon a substantially level refrigerated surface, supplying a liquid refrigerant to the area between said walls to immerse the product therein, and moving the walls with the distributed and partially immersed food product therebetween along the refrigerated surface.

14. The process of freezing food products, which includes the steps of wetting a product with a spray of liquid refrigerant, advancing the sprayed product in contact with a substantially level refrigerated heat-conductive surface and at the same time reducing the temperature of the liquid refrigerant by contact with the said refrigerated surface.

15. The process of freezing food products, which includes the steps of passing a product over a substantially level refrigerated surface while in heat-conductive relation with the refrigerated surface through the medium of a liquid refrigerant and at the same time reducing the temperature of the liquid refrigerant by contact with the said refrigerated surface.

16. The process of freezing food products, which consists in movably supporting product-confining walls on a refrigerated surface, placing into the area between the walls a liquid refrigerant carrying a partially immersed food product, and then moving the refrigerant and the product first across and then off said surface.

17. The process of freezing food products, which consists in moving product-confining means across refrigerated surfaces having relatively offset discharge openings, placing within the product-confining means food products and a liquid refrigerant, and transferring both the food products and the refrigerant from one surface to another as the partially immersed food arrives at the discharge openings.

18. In an apparatus for refrigerating food products, the combination with a hollow heat-conductive refrigerated plate disposed in substantially level position and means for supplying a refrigerating medium to the interior of the plate, of means for passing a product to be refrigerated along and in contact with the surface of said plate, and means for applying a liquid refrigerant to the product and the surface of the plate at a temperature lower than that of the product, whereby the refrigerant aids in transferring heat from the product to the plate, and means for subsequently separating the liquid refrigerant from the product and recirculating the liquid over the surface of the plate and in contact with additional product to be refrigerated.

19. In an apparatus for freezing food products, the combination of a series of horizontal refrigerated plates, spaced one above another and provided with openings whereby a product may be transferred by gravity from one to another, in combination with open bottom grills supported upon said plates, means for moving the grills with a product distributed therein along the surface of the plates and over the openings therein, and means for supplying a low-freezing-point liquid refrigerant in quantity sufficient partially to immerse said food product within the area of the grill.

20. In an apparatus for freezing solid food products, the combination of a level refrigerated plate with walls upstanding from its surface and defining a circular freezing zone thereon, an open bottom grill providing a plurality of compartments with the underlying surface of said plate, a pipe for delivering liquid refrigerant to said compartments in quantity to overflow the grill and to float a solid food product therein, and means for moving the grill along the said surface of the plate while its compartments contain food products partially immersed in a liquid refrigerant.

21. In apparatus for freezing food products, the combination of a horizontal refrigerated plate, with a frame movable upon the surface of the plate and having walls providing a plurality of compartments for containing products to be frozen, and means for supplying a liquid refrigerant to all of said compartments, the common walls thereof being apertured to permit the said refrigerant to flow laterally from one to another of the compartments.

22. Apparatus for freezing food products including in its structure a plurality of superposed vertically spaced hollow plates for supporting products to be frozen, means for delivering a refrigerating medium to the interior of said plates, means for supplying a liquid refrigerant to the products upon said plates, and outwardly and upwardly diverging walls on certain of said plates for catching liquid refrigerant overflowing from the surfaces of the plates above them.

CLARENCE BIRDSEYE.